US012660039B2

(12) United States Patent (10) Patent No.: US 12,660,039 B2
Xu et al. (45) Date of Patent: Jun. 16, 2026

(54) MULTIPLE ACTIVE DISCONTINUOUS RECEPTION CONFIGURATIONS

(71) Applicant: QUALCOMM Incorporated, San Diego, CA (US)

(72) Inventors: Huilin Xu, Temecula, CA (US); Le Liu, San Jose, CA (US); Wanshi Chen, San Diego, CA (US); Prashanth Haridas Hande, San Diego, CA (US); Linhai He, San Diego, CA (US); Diana Maamari, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 300 days.

(21) Appl. No.: 18/467,556

(22) Filed: Sep. 14, 2023

(65) Prior Publication Data

US 2024/0114590 A1 Apr. 4, 2024

Related U.S. Application Data

(60) Provisional application No. 63/412,190, filed on Sep. 30, 2022.

(51) Int. Cl.
*H04H 20/71* (2008.01)
*H04W 76/28* (2018.01)
*H04W 76/40* (2018.01)

(52) U.S. Cl.
CPC ........... *H04W 76/28* (2018.02); *H04W 76/40* (2018.02)

(58) Field of Classification Search
CPC .............................. H04W 76/28; H04W 76/40
(Continued)

(56) References Cited

U.S. PATENT DOCUMENTS

2021/0144639 A1* 5/2021 Zhang ............... H04W 52/0219
2021/0144797 A1* 5/2021 Zhang ................... H04W 24/08
(Continued)

FOREIGN PATENT DOCUMENTS

CN 111901763 A 11/2020
EP 4142313 A1 3/2023
(Continued)

OTHER PUBLICATIONS

International Search Report and Written Opinion—PCT/US2023/074402—ISA/EPO—Jan. 19, 2024.
(Continued)

*Primary Examiner* — Chuong T Ho
(74) *Attorney, Agent, or Firm* — Paul M. McAdams; Polsinelli

(57) ABSTRACT

Systems and techniques are provided for wireless communication. A first network entity (e.g., a user equipment (UE)) can receive information indicative of a configuration for multicast discontinuous reception (DRX). The information can be received from a second network entity (e.g., a base station). The first network entity can perform unicast data communication using one or more multicast DRX cycles of a plurality of multicast DRX cycles corresponding to the configuration, wherein the unicast data communication is performed between the first network entity and the second network entity. A second network entity (e.g., a base station) can transmit, to a user equipment (UE), information indicative of a configuration for multicast discontinuous reception (DRX). The second network entity can perform unicast data communication with the UE using one or more multicast DRX cycles of a plurality of multicast DRX cycles corresponding to the configuration.

29 Claims, 9 Drawing Sheets

(58) Field of Classification Search
USPC .......................................................... 370/312
See application file for complete search history.

(56) References Cited

U.S. PATENT DOCUMENTS

| | | |
|---|---|---|
| 2022/0286818 A1 | 9/2022 | Chin et al. |
| 2023/0060894 A1 | 3/2023 | Rastegardoost et al. |
| 2023/0147122 A1 | 5/2023 | Canonne-Velasquez et al. |
| 2023/0262836 A1* | 8/2023 | Yu ......................... H04L 1/1812 |
| 2024/0187140 A1* | 6/2024 | Di Girolamo .......... H04L 1/188 |
| 2024/0188186 A1* | 6/2024 | Dai ......................... H04W 4/06 |

FOREIGN PATENT DOCUMENTS

| | | |
|---|---|---|
| WO | 2017120476 A1 | 7/2017 |
| WO | 2022099181 A2 | 5/2022 |

OTHER PUBLICATIONS

ZTE, et al., "CSI and SRS reporting in MBS DRX", R2-2203311, 3rd Generation Partnership Project, Mobile Competence Centre, 650, Route Des Lucioles, F-06921 Sophia-Antipolis Cedex, France, vol. RAN WG2, No electronic, Feb. 21, 2022-Mar. 3, 2022, Feb. 14, 2022, pp. 1-4, XP052111114.

\* cited by examiner

A Method Of Wireless Communication By A Network Entity

Transmit, To A User Equipment (UE), Information Indicative Of A Configuration For Multicast Discontinuous Reception (DRX) ⟍ 805

Perform Unicast Data Communication With The UE Using One Or More Multicast DRX Cycles Of A Plurality Of Multicast DRX Cycles Corresponding To The Configuration ⟍ 810

800

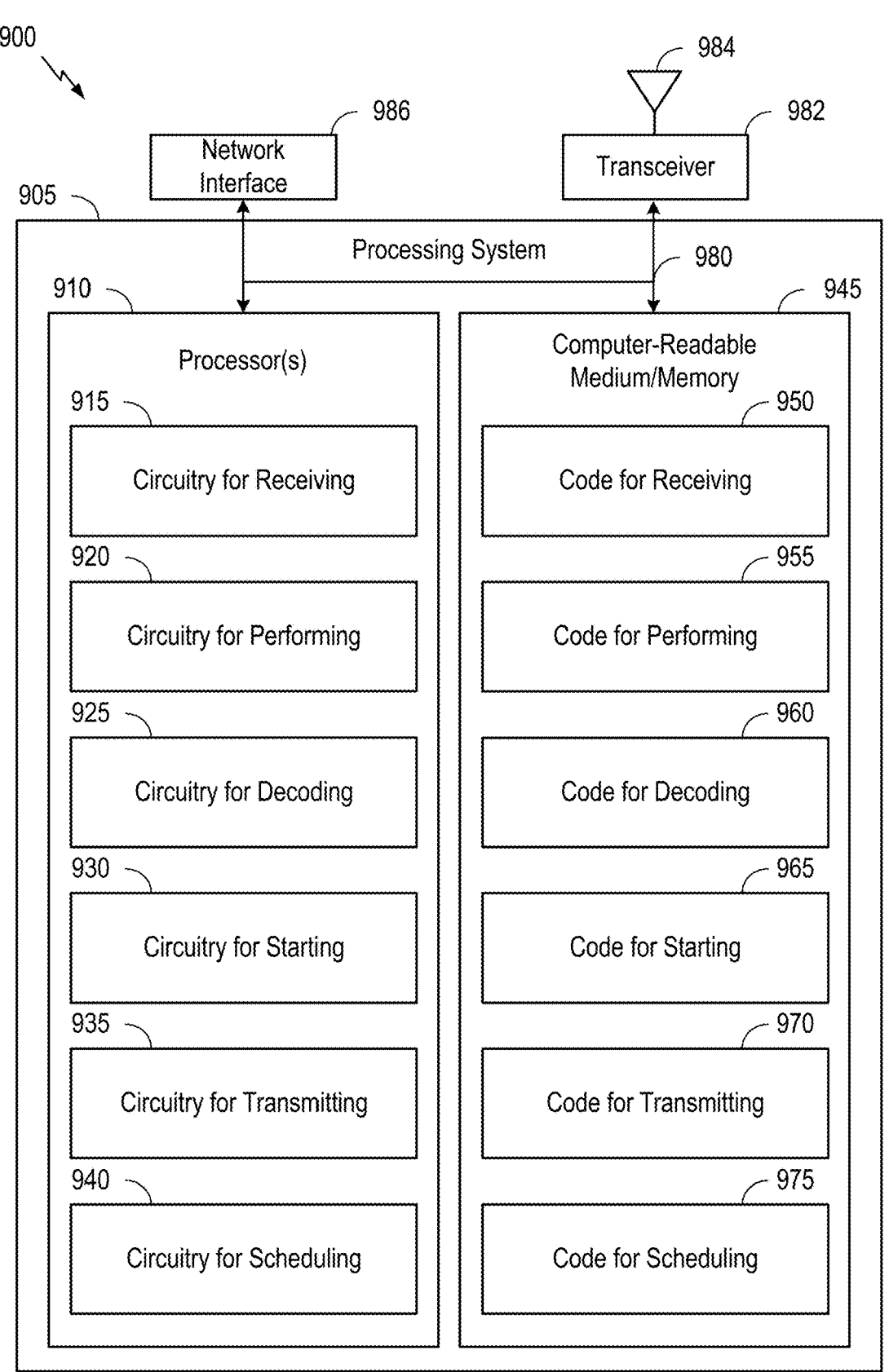

900

984

986

Network Interface

982

Transceiver

905

Processing System

980

910

Processor(s)

945

Computer-Readable Medium/Memory

915

Circuitry for Receiving

950

Code for Receiving

920

Circuitry for Performing

955

Code for Performing

925

Circuitry for Decoding

960

Code for Decoding

930

Circuitry for Starting

965

Code for Starting

935

Circuitry for Transmitting

970

Code for Transmitting

940

Circuitry for Scheduling

975

Code for Scheduling

*FIG. 9*

MULTIPLE ACTIVE DISCONTINUOUS RECEPTION CONFIGURATIONS

CROSS-REFERENCE TO RELATED APPLICATIONS

This application claims the benefit of U.S. Provisional Application No. 63/412,190, filed Sep. 30, 2022, which is hereby incorporated by reference, in its entirety and for all purposes.

FIELD

Aspects of the present disclosure generally relate to wireless communication. In some implementations, examples are described for wireless communication using multiple active discontinuous reception (DRX) configurations.

INTRODUCTION

Wireless communications systems are deployed to provide various telecommunication services, including telephony, video, data, messaging, broadcasts, among others. Wireless communications systems have developed through various generations, including a first-generation analog wireless phone service (1G), a second-generation (2G) digital wireless phone service (including interim 2.5G networks), a third-generation (3G) high speed data, Internet-capable wireless service, a fourth-generation (4G) service (e.g., Long-Term Evolution (LTE), WiMax), and a fifth-generation (5G) service (e.g., New Radio (NR)). There are presently many different types of wireless communications systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing wireless communication. According to at least one illustrative example a method of wireless communication is provided, the method including: receiving, from a second network entity, information indicative of a configuration for multicast discontinuous reception (DRX); and performing unicast data communication using one or more multicast DRX cycles of a plurality of multicast DRX cycles corresponding to the configuration, wherein the unicast data communication is between the first network entity and the second network entity.

In another illustrative example, a network entity for wireless communication is provided. The network entity includes at least one memory and at least one processor coupled to the at least one memory. The at least one processor is configured to and can: receive, from a second network entity, information indicative of a configuration for multicast discontinuous reception (DRX); and perform unicast data communication using one or more multicast DRX cycles of a plurality of multicast DRX cycles corresponding to the configuration, wherein the unicast data communication is between the first network entity and the second network entity.

In another illustrative example, a non-transitory computer-readable storage medium comprising instructions stored thereon which, when executed by at least one processor, causes the at least one processor to: receive, from a second network entity, information indicative of a configuration for multicast discontinuous reception (DRX); and perform unicast data communication using one or more multicast DRX cycles of a plurality of multicast DRX cycles corresponding to the configuration, wherein the unicast data communication is between the first network entity and the second network entity.

In another illustrative example, an apparatus is provided for wireless communication. The apparatus includes: means for receiving, from a second network entity, information indicative of a configuration for multicast discontinuous reception (DRX); and means for performing unicast data communication using one or more multicast DRX cycles of a plurality of multicast DRX cycles corresponding to the configuration, wherein the unicast data communication is between the first network entity and the second network entity.

According to at least one illustrative example a method of wireless communication is provided, the method including: transmitting, to a user equipment (UE), information indicative of a configuration for multicast discontinuous reception (DRX); and performing unicast data communication with the UE using one or more multicast DRX cycles of a plurality of multicast DRX cycles corresponding to the configuration.

In another illustrative example, a network entity for wireless communication is provided. The network entity includes at least one memory and at least one processor coupled to the at least one memory. The at least one processor is configured to and can: transmit, to a user equipment (UE), information indicative of a configuration for multicast discontinuous reception (DRX); and perform unicast data communication with the UE using one or more multicast DRX cycles of a plurality of multicast DRX cycles corresponding to the configuration.

In another illustrative example, a non-transitory computer-readable storage medium comprising instructions stored thereon which, when executed by at least one processor, causes the at least one processor to: transmit, to a user equipment (UE), information indicative of a configuration for multicast discontinuous reception (DRX); and perform unicast data communication with the UE using one or more multicast DRX cycles of a plurality of multicast DRX cycles corresponding to the configuration.

In another illustrative example, an apparatus is provided for wireless communication. The apparatus includes: means for transmitting, to a user equipment (UE), information indicative of a configuration for multicast discontinuous reception (DRX); and means for performing unicast data communication with the UE using one or more multicast DRX cycles of a plurality of multicast DRX cycles corresponding to the configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip implementations or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9 depicts aspects of an example communications device.

DETAILED DESCRIPTION

Figure 1:
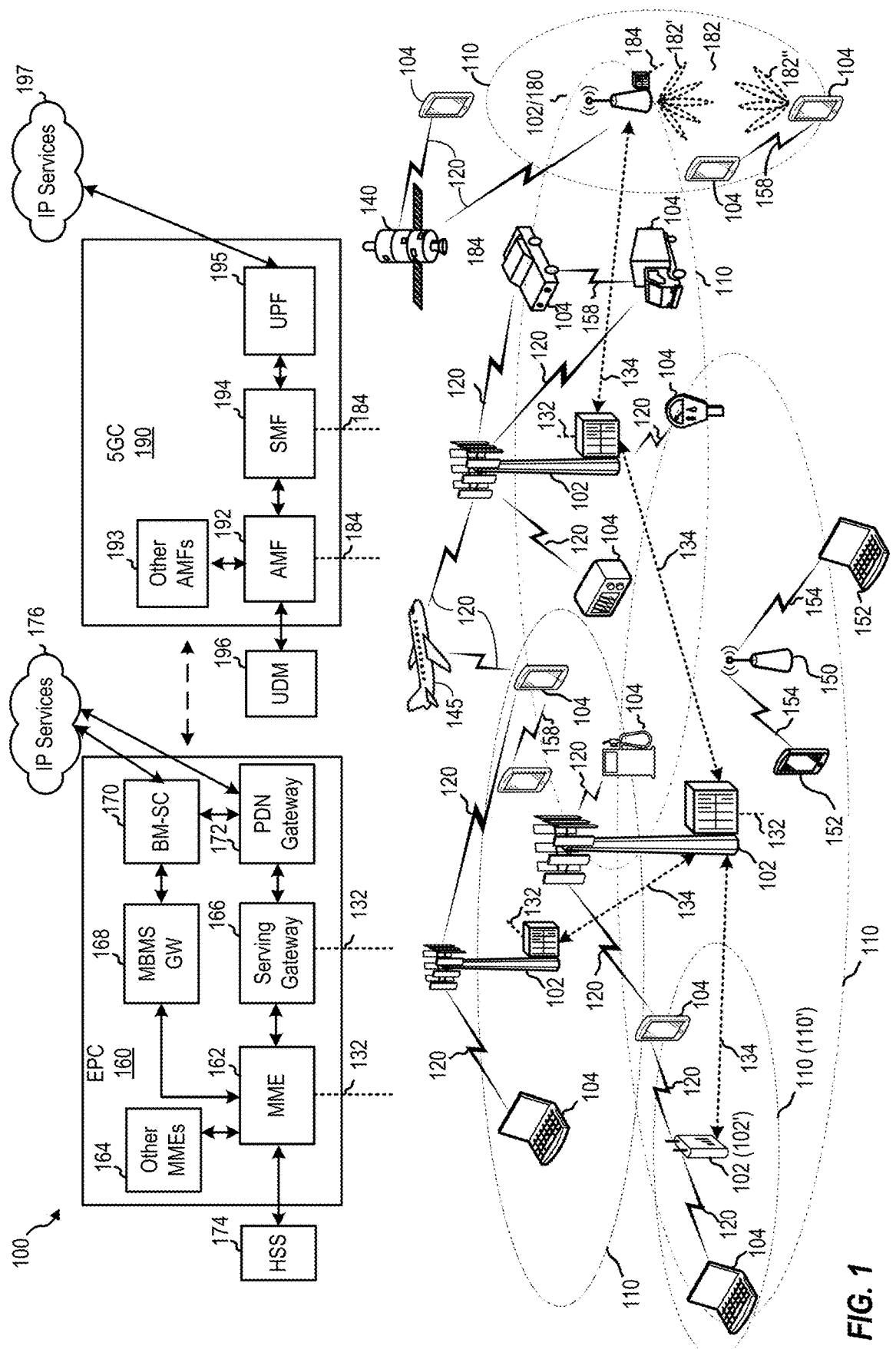
FIG. 1 depicts an example wireless communications network.

Aspects of the present disclosure provide apparatuses, methods, processing systems, and computer-readable mediums for performing wireless communications based on using multiple active discontinuous reception (DRX) configurations. For example, wireless communications can be performed based on using a multicast DRX configuration for unicast data transmission.

5G new radio (NR) provides a high-speed, low-latency and high-reliability wireless connectivity which can enable a wide variety of applications, including immersive extended reality (XR) multimedia and cloud computing services. These advanced multimedia applications may require high data rates and/or low latency to help traffic meet a corresponding packet delay budget (PDB), which generally refers to an upper bound for the delay of the data packets transferred by a bearer.

Advanced multimedia applications may also require better power saving functionality to improve XR device performance. To reduce power consumption, a user equipment (UE) may be configured for discontinuous reception (DRX). When operating in a DRX mode (e.g., performing wireless communications using a DRX configuration), a UE may implement a plurality of DRX cycles that can be broadly divided into "Active" time durations and "non-Active" time durations. For example, a UE may wake up to monitor for downlink scheduling information during a periodic DRX-enabled state (e.g., corresponding to the Active time durations) and may enter a sleep or idle mode outside of the periodic DRX-enabled state (e.g., corresponding to the non-Active time durations). In some examples, the use of DRX mode can impact latency-sensitive communications and/or wireless communication devices associated with relatively tight (e.g., relatively small) delay budgets. For instance, the use of DRX mode can impact XR device performance because data is not typically received during non-Active time durations.

For example, XR traffic is typically characterized by multiple data flows to and/or from an XR device (e.g., one or multiple video flows, an audio flow, etc.) and having tight delay budgets (10 ms, 30 ms etc.). Further, the multiple flows may have unaligned data periodicities, such as 30 or 60 frames per second (fps) for video and 10 ms for audio, etc. In some cases, the use of DRX mode can impact XR device performance when the DRX periodicity is different from (e.g., is not aligned with) a data flow periodicity of the XR traffic associated with the XR device. For instance, a device configured with a DRX periodicity of 100 ms and an Active duration of 10 ms may be unable to receive a majority of the data included in a 30 fps or 60 fps data flow. In addition to the multiple XR traffic data flows that may be associated with an XR device (e.g., the multiple latency-sensitive or tight delay budget data flows), control data and other less delay sensitive data can also be transmitted to and/or from the XR device.

To accommodate these different requirements associated with the multiple data flows, it would be desirable for the network (e.g., a gNB) to configure multiple active connected DRX (CDRX) configurations for an XR device, with each active CDRX configuration corresponding to a respective traffic flow with a different periodicity and/or delay requirement. Multiple active CDRX configurations may provide significant performance improvements, but in at least some examples, would require changes to wireless communications standard specifications for DRX and/or CDRX, etc.

Aspects of the present disclosure provide systems and techniques for using multicast DRX cycles to perform unicast data transmission of delay sensitive data (e.g., such as XR video or audio, etc.). Potential benefits of this approach include relatively low implementation complexity and operational complexity associated with the semi-static DRX based design. Further, these benefits may come without major impact to wireless communications standards as may otherwise be associated with introducing a second active unicast DRX configuration.

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
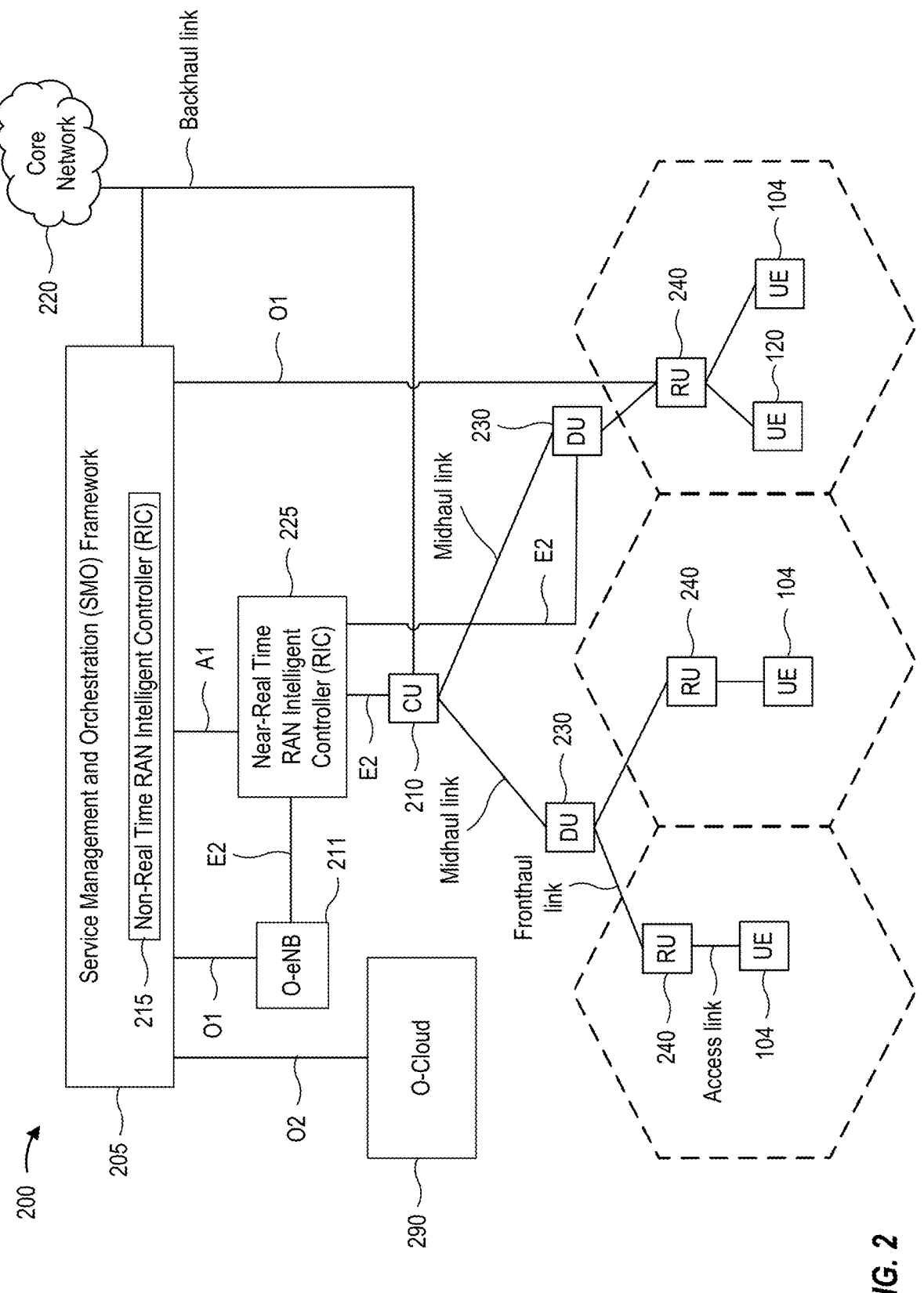
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs)

152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
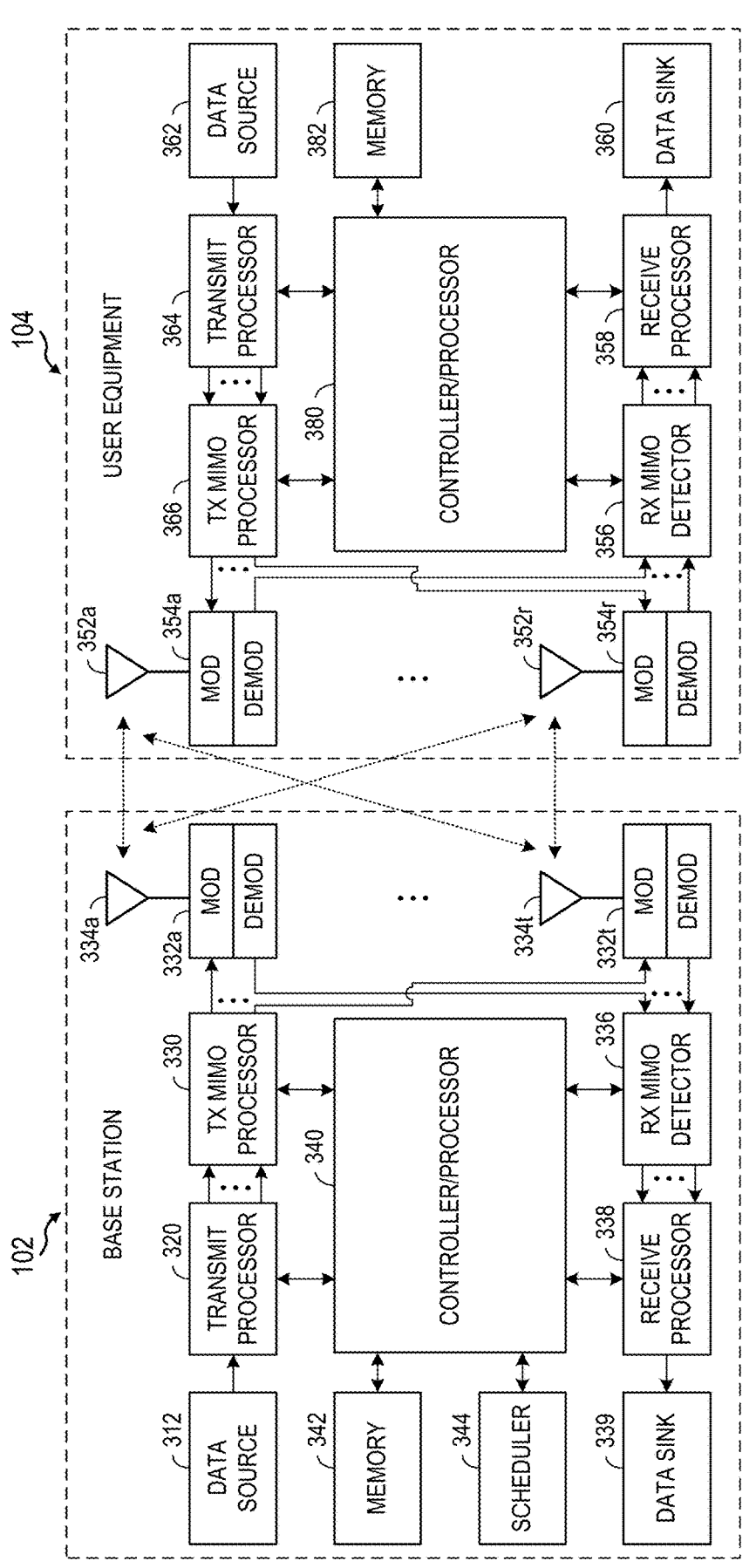
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a-332t*. Each modulator in transceivers 332*a-332t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a-332t* may be transmitted via the antennas 334*a-334t*, respectively.

In order to receive the downlink transmission, UE 104 includes antennas 352*a-352r* that may receive the downlink signals from the BS 102 and may provide received signals to the demodulators (DEMODs) in transceivers 354*a-354r*, respectively. Each demodulator in transceivers 354*a-354r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a-354r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source

362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a-354r* (e.g., for SC-FDM), and transmitted to BS 102.

At BS 102, the uplink signals from UE 104 may be received by antennas 334*a-t*, processed by the demodulators in transceivers 332*a-332t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
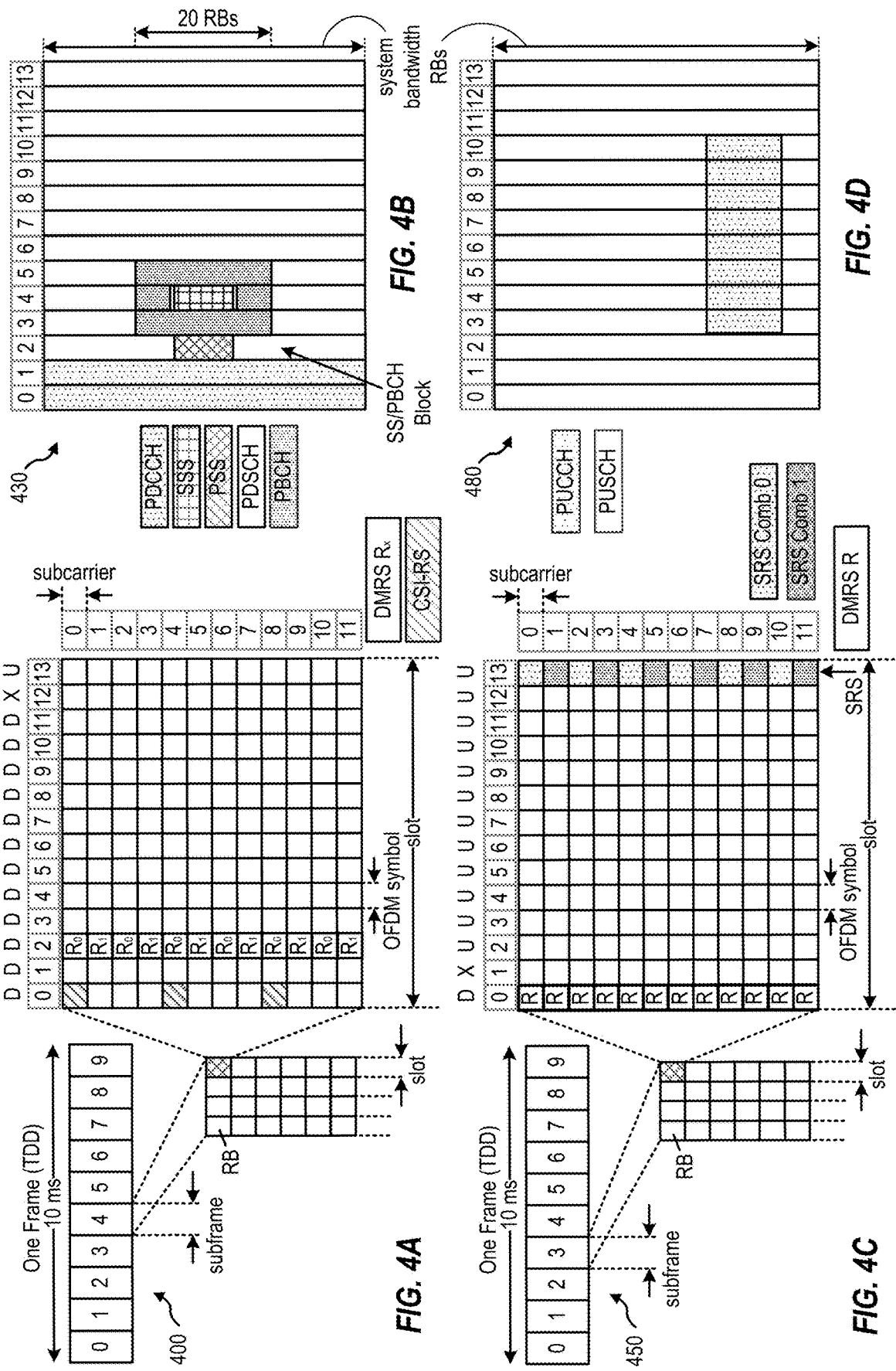
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

To reduce power consumption, a user equipment (UE) may be configured for discontinuous reception (DRX) operations. DRX can be implemented as a power saving technique based on managing the energy efficiency or energy consumption of various periodic communications between UEs and network entities. For instance, DRX can be used to switch off a radio receiver of a UE at a configured periodicity, such as when data (e.g., or various other downlink transmissions) is not expected. DRX operations may include connected mode DRX (CDRX) and idle mode DRX.

CDRX can be used when a UE is in a connected state (e.g., when a UE has an established connection with a network (e.g., an established RRC Connection)). Idle mode DRX can be used when the UE is in an idle or inactive state and does not have an established connection with a network (e.g., does not have an established RRC connection). In the connected mode DRX, one or more CDRX parameters can be configured by the network (e.g., by a network entity, gNB, base station, etc.). For instance, a network entity can configure one or more of a DRX cycle, an on-duration timer, an inactivity timer, etc. The CDRX parameters (e.g., also referred to as "DRX parameters") can be configured based on CDRX configuration information included in one or more RRC messages. The CDRX configuration information can also be referred to as a "CDRX configuration" and/or a "DRX configuration."

Figures 5A, 5B:
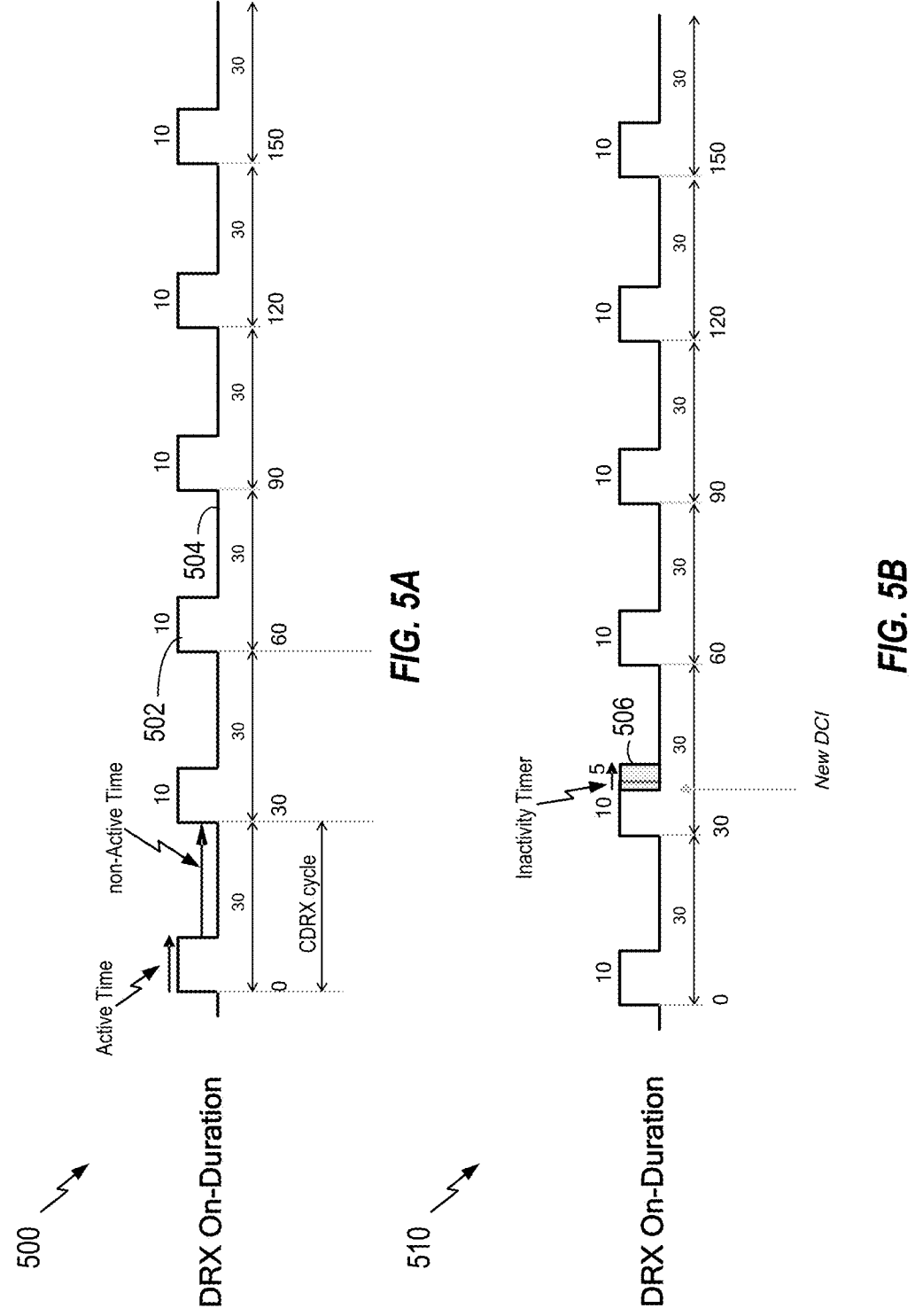
FIG. 5A and FIG. 5B depict example connected-mode discontinuous reception (CDRX) timelines.

FIG. 5A illustrates an example CDRX timeline 500. As illustrated in the CDRX timeline of the timing diagram 500, during a connected DRX mode (CDRX), a UE duration (e.g., along the horizontal time axis) can be broadly divided into a series of "Active time" durations 502 and "non-Active" time durations 504. A CDRX cycle may include one Active time duration 502 and one non-Active time duration 504.

During a CDRX Active time 502 (e.g., also referred to as an On-Duration), the UE monitors for physical downlink shared channel (PDSCH) activity continuously or with a given periodicity, receives downlink (DL) data, transmits uplink (UL) data, and/or makes serving cell measurements or neighbor measurements. During the CDRX Active time 502, a UE is generally considered "on" while various timers are running. For example, an Active duration timer (e.g., drx-onDurationTimer), an inactivity timer (drx-Inactivity-Timer), and a complete DRX cycle duration (e.g., drx-ShortCycle) may run during an Active time (e.g., during CDRX Active time 502). The beginning of a DRX cycle may be defined by a starting offset value.

In the examples shown in FIGS. 5A and 5B, the active time (e.g., drx-onDurationTimer) is 10 ms and the CDRX cycle duration is 30 ms (e.g., corresponding to a non-active time of approximately 20 ms, in the example of a zero offset). FIG. 5B illustrates an example CDRX timeline 510 that includes an inactivity timer. For instance, as illustrated the timing diagram of FIG. 5B, the UE may be configured with an inactivity timer (e.g., the inactivity timer starting an inactivity period 506) that restarts when activity is detected and expires after 5 ms of no activity detected. When the inactivity timer expires, the UE enters an "inactive" or "sleep" mode. For instance, while the inactivity timer is active, if UE activity is detected every 5 ms (or less), the UE will not enter the inactive or sleep mode while the inactivity timer remains active.

In some cases, a UE may be configured with an enhanced CDRX (eCDRX) mode to mitigate drift in latency resulting from misalignment with traffic burst arrivals. Current CDRX mode is configured for integer value periodicity, while typical multimedia data traffic update rates (e.g., 60 Hz, 90 Hz, 45 Hz, 120 Hz, or 48 Hz) often lead to non-integer value periodicity.

Aspects of the present disclosure can utilize multicast DRX cycles to perform unicast data transmission of delay sensitive data (e.g., such as XR video or audio, etc.). The use of multicast DRX cycles for unicast data transmission of delay sensitive data can include a relatively low implementation complexity and/or a relatively low operational complexity associated with implementing a semi-static DRX based design. Further these benefits may come without major impact to wireless communication standards to introduce a second active unicast DRX configuration.

Figure 6:
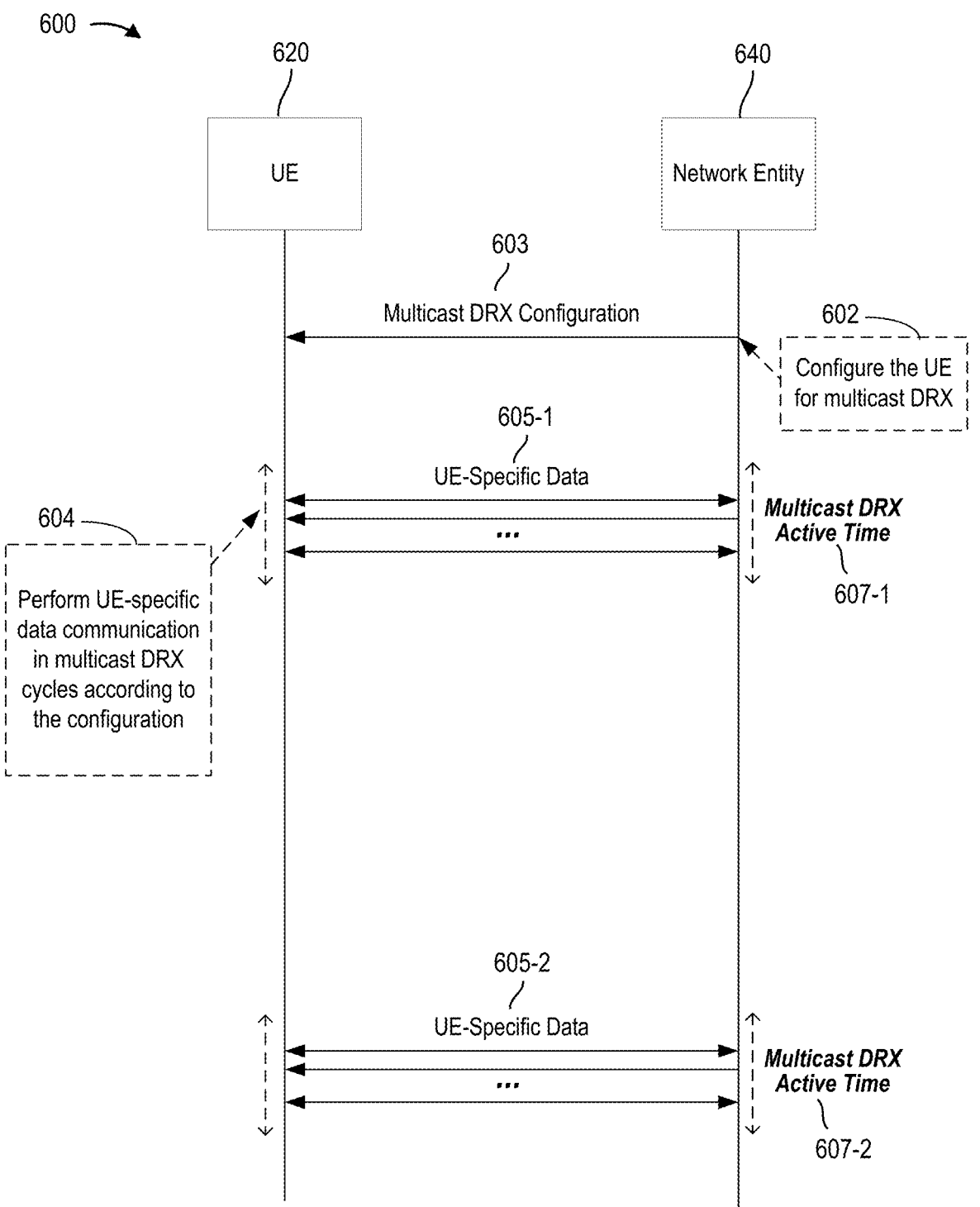
FIG. 6 is a call-flow diagram for an example of lag-selective time correlation reporting, in accordance with certain aspects of the present disclosure.

The use of multicast DRX cycles for unicast data transmission proposed herein may be understood with reference to the example call flow diagram 600 of FIG. 6, which shows example signaling between a UE 620 and a network entity 640. In some aspects, the UE 620 may be an example of one of the UEs 104 illustrated in FIG. 1, FIG. 2, and/or FIG. 3. In some aspects, the network entity 640 can be a base station, gNB, etc. For example, the network entity 640 may be an example of a base station 102 illustrated in FIG. 1 or FIG. 3 and/or an example of a node of a disaggregated base station, as illustrated in FIG. 2.

As illustrated, at 602, the network entity 640 may transmit signaling configuring the UE 620 for multicast discontinuous reception (DRX). For instance, the network entity 640 can transmit configuration information indicative of a DRX configuration 603. In one illustrative example, the DRX configuration 603 is a multicast DRX configuration (e.g., the network entity 640 can transmit configuration information indicative of a multicast DRX configuration). The UE 620 can receive the signaling from the network entity 640 at 602 and can implement one or more corresponding DRX cycles (e.g., one or more corresponding DRX cycles using the DRX configuration 603 from the network entity 640).

For instance, the DRX configuration 603 from the network entity 640 can include and/or be indicative of one or more DRX parameters (e.g., CDRX parameters) associated with implementing corresponding DRX cycles by the UE 620. In some examples, the network entity 640 can transmit the DRX configuration information 603 (e.g., and the UE 620 can receive the DRX configuration information 603) using one or more Radio Resource Control (RRC) messages.

As illustrated, at 604, the UE 620 may perform UE-specific data communications during the respective active time (e.g., drx-onDuration) of each multicast DRX cycle of a plurality of multicast DRX cycles, according to the DRX configuration information 603 received from the network entity 640 at 602. For instance, each multicast DRX cycle can be associated with a corresponding multicast DRX active time. As illustrated in FIG. 6, a first multicast DRX cycle can be associated with a first multicast DRX active time 607-1, a second multicast DRX cycle can be associated with a second multicast DRX active time 607-2, . . . , etc. In some aspects, each multicast DRX active time 607-1, 607-2, etc., can be the same as or similar to the DRX Active time 502 of FIG. 5A.

During the first multicast DRX active time 607-1 (e.g., during the first multicast DRX cycle corresponding to the multicast DRX configuration 603), the UE 620 can transmit and/or receive UE-specific data 605-1. For instance, during the first multicast DRX active time 607-1 of the first multicast DRX cycle, the UE can perform one or more data transmission operations corresponding to a UE-specific data (e.g., UE-specific data 605-1) and/or the UE can perform one or more data reception operations corresponding to a UE-specific data (e.g., UE-specific data 605-2).

During the second multicast DRX active time 607-2 (e.g., during the second multicast DRX cycle corresponding to the multicast DRX configuration 603) the UE can perform one or more data transmission operations corresponding to a UE-specific data (e.g., UE-specific data 605-2) and/or the UE can perform one or more data reception operations corresponding to a UE-specific data (e.g., UE-specific data 605-2).

In this manner, the systems and techniques can be used to effectively borrow (e.g., reconfigure) a multicast/broadcast (MB) DRX cycle to transmit and/or receive unicast data for a UE (e.g., UE 620). In some aspects, the UE-specific data 605-1 and/or the UE-specific data 605-2 can be unicast data associated with the UE 620. In one illustrative example, the systems and techniques can be used to configure an XR device (e.g., an XR UE, the same as or similar to UE 620) to utilize a multicast DRX cycle and/or a multicast DRX configuration to transmit UE-specific unicast data when a single unicast DRX is insufficient to support multiple XR flows (e.g., and the corresponding latency requirements for each of the multiple XR flows). The systems and techniques may provide an effective alternative to having to support multiple active unicast DRX configurations (e.g., which is not supported by current wireless communication standard specifications).

In some aspects, utilizing an MB DRX configuration for unicast data transmission, as proposed herein, may be achieved with relatively little impact on wireless communication standard specifications and with relatively minor additional UE implementation. For these reasons, this approach may be an acceptable design to be adopted to better support XR.

There are various options for configuring a multicast DRX for unicast data transmission. Multicast DRX is typically configured for multicast point-to-multipoint (PTM) transmission on a per Group RNTI (G-RNTI) basis, independent of the legacy UE-specific unicast DRX. Multicast point-to-point (PTP) transmissions (including PTP retransmission for PTM data) are typically transmitted during the active time (e.g., drx-onDuration) of a unicast DRX cycle, for example, based on UE-specific dynamic scheduling Cell RNTI (C-RNTI) or configured scheduling RNTI (CS-RNTI). CS-RNTI generally refers to a unique UE identification used for Semi-Persistent Scheduling (SPS) in the downlink and configured grant in the uplink configured scheduling for configured scheduling.

In one illustrative example, a network (e.g., a network entity, such as network entity 640) may configure a UE to receive a scheduling PDCCH and to perform UE-specific data communication in a multicast DRX active time (e.g., the active time or drx-onDuration of a multicast DRX cycle) based on various options. For example, a first option can be implemented based on a signaled indication from the network (e.g., an indication signaled and/or transmitted by a network entity, such as network entity 640). In some aspects, a UE (e.g., UE 620) can receive the signaled indication in an RRC configuration of the multicast DR, where the signaled indication configures the UE to receive the scheduling PDCCH and perform UE-specific data communication (e.g., unicast data transmission) in a multicast DRX active time.

Another option to indicate that a UE is enabled to receive scheduling PDCCH and perform UE-specific data communication in the multicast DRX active time is to set a value of a configured G-RNTI to a same value as C-RNTI. For instance, based on receiving configuration information indicative of a configured G-RNTI that is equal to (e.g., the same as) the C-RNTI, the UE can be configured to perform unicast data transmission (e.g., UE-specific data communication) during a multicast DRX active time. A network entity may typically configure multicast DRX on a per G-RNTI basis. In this case, the UE (e.g., UE 620) may compare the C-RNTI with each of the configured G-RNTIs. In response to identifying or determining any G-RNTI that is equal to the C-RNTI, the UE can determine that the multicast DRX associated with this G-RNTI is used for unicast data transmission. For instance, based on a configured G-RNTI that is equal to the C-RNTI for the UE 620, the UE 620 may be configured to perform unicast data transmission using the multicast DRX cycles corresponding to the configured G-RNTI.

In some aspects, UE unicast communication in the multicast DRX active time may be based on the corresponding multicast DRX configuration. For example, the multicast DRX configuration may specify various parameters, such as: drx-onDurationTimerPTM, drx-InactivityTimerPTM, drx-LongCycleStartOffsetPTM, drx-SlotOffsetPTM, and drx-HARQ-RTT-TimerDL, and drx-RetransmissionTimerDL.

In some cases, if a multicast DRX is configured for unicast data communication, the UE may monitor for a PDCCH (e.g., transmitted by network entity 640) that is CRC scrambled by the corresponding C-RNTI of the UE 620 within the active time of the multicast DRX. In some examples, the PDCCH is configured to schedule at least one of the first transmission or retransmission for the unicast data. In some aspects, where configured scheduling is utilized, multicast DRX can be configured for unicast data communication based on the UE monitoring for a PDCCH that is CRC scrambled by CS-RNTI. The techniques proposed herein may be different than scheduling of retransmission for the multicast data, which is not performed within the active time of the multicast DRX but only the active time of unicast DRX.

For XR latency stringent service, it may be important to quickly deliver the retransmission of failed data. For instances, deferring the retransmission of failed data to another DRX or DRX cycle (e.g., a so-called legacy unicast DRX) may reduce the UE throughput performance. This is one potential benefit of using different active DRX configurations for different traffic flows.

As described with reference to FIG. 5B, a DRX inactivity timer (drx-InactivityTimer) such as the inactivity timer 506 generally specifies the time period for which a UE should be active after successfully decoding a PDCCH indicating a new transmission (e.g., a UL transmission or a DL transmission). The DRX inactivity timer can be started and/or restarted upon receiving (e.g., by the UE) a PDCCH for a new transmission (e.g., UL or DL). Upon the expiry of the DRX inactivity timer, the UE can enter or enable DRX mode.

According to certain aspects of the present disclosure, if both a unicast DRX and a multicast DRX are configured for unicast data communication and if both DRXs are active, a drx-InactivityTimer for at least one of the two DRXs (e.g., the unicast DRX or the multicast DRX) may be started or restarted when the UE successfully decodes a PDCCH indicating a new transmission.

In some aspects, the UE may be configured to always start or restart the drx-InactivityTimer of either the unicast DRX or the multicast DRX based on the UE successfully decoding a PDCCH indicating a new transmission.

In some examples, the UE may be configured to start or restart the drx-InactivityTimer for an indicated (e.g., indicated or configured by a network entity, such as network entity 640) one of either the unicast DRX or the multicast DRX. For instance, the network entity 640 can transmit (and the UE 620 can receive) configuration information indicating that the drx-InactivityTimer should be started or restarted for the unicast DRX, or indicating that the drx-InactivityTimer should be stated or restarted for the multicast DRX.

In another illustrative example, the UE may be configured to start or restart the drx-InactivityTimer for the DRX cycle (e.g., one of either the unicast DRX or the multicast DRX) for which the UE has most recently performed a previous start or restart. For instance, a drx-InactivityTimer start or restart can be based on the UE successfully decoding a PDCCH indicating a new transmission. In some examples, if the most recent PDCCH indicating a new transmission was successfully decoded for the unicast DRX, the UE can restart the drx-InactivityTimer for the unicast DRX upon receiving the next PDCCH indicating a new transmission. If the most recent PDCCH indicating a new transmission was successfully decoded for the multicast DRX, the UE can restart the drx-InactivityTimer for the multicast DRX upon receiving the next PDCCH indicating a new transmission.

In another illustrative example, if a DCI format of the PDCCH is only configured (e.g., within the search space set configured for PDCCH monitoring for the unicast or multicast DRX) for one of the DRXs, then the UE may be configured to start or restart the drx-InactivityTimer corresponding to the DRX with the DCI format of the PDCCH configured (e.g., start or restart the drx-InactivityTimer after successfully decoding the PDCCH with the configured DCI format available for the UE).

There are various options for UL unicast data transmission (e.g., UL data transmitted by the UE 620 to the network entity 640, etc.) performed during the active time of the multicast DRX (e.g., during the multicast DRX on-duration or Active time (e.g., such as the first multicast DRX active time 607-1 corresponding to the first multicast DRX cycle, the second multicast DRX active time 607-2 corresponding to the second multicast DRX cycle, etc.). In some aspects, the UL unicast data transmission may be scheduled by G-RNTI. In another example, the UL unicast data transmission can be scheduled by C-RNTI or CS-RNTI.

In some aspects, the systems and techniques can be used to configure the enabling and disabling of hybrid automatic repeat request (HARQ) feedback for unicast data transmitted in the configured multicast DRX. For instance, in one illustrative example, HARQ feedback may always be enabled for the UE (e.g., not based on configuration information from the network entity 640 to the UE 620)

In another illustrative example, HARQ feedback can be enabled and/or disabled for the UE 620 based on information included in or indicated by the multicast DRX configuration (e.g., the multicast DRX configuration 603). In some cases, HARQ feedback may be enabled by default (e.g., if the configuration is not provided by the network entity 640 (e.g., base station, gNB, etc.)). For multicast data transmission, HARQ feedback may by default be disabled.

According to certain aspects, for control and data reception, the UE 620 may utilize (e.g., follow) a unicast configuration or may utilize (e.g., follow) a multicast configuration where unicast data is received in the multicast DRX active time. For example, to perform unicast data communication during the active time (e.g., drx-onDuration) of multicast DRX (e.g., during a multicast DRX cycle on-duration), the UE may utilize unicast PDCCH configured according to a multicast PDCCH configuration in PDCCH-Config-Multicast. In another example, unicast PDCCH may be configured according to a unicast PDCCH configuration in PDCCH-Config.

According to certain aspects, unicast PDSCH may be configured according to various options. For example, according to one option, unicast PDSCH may be configured based on a multicast PDSCH configuration in PDSCH-Config-Multicast. According to another option, unicast PDSCH may be configured based on a unicast PDSCH Configuration in PDSCH-Config.

According to certain aspects, unicast PDSCH by configured scheduling (CS) may be configured based on a multicast SPS configuration in SPS-config-Multicast or may be configured based on a unicast SPS configuration in SPS-config.

According to certain aspects, for unicast data communication in an active time of multicast DRX (e.g., first multicast DRX active time 607-1, second multicast DRX active time 607-2, etc.), a UE can receive a scheduling downlink control information (DCI) from the network entity 640. For instance, the scheduling DCI can be based on multicast DCI formats (e.g., 4_1, 4_2) or can be based on unicast DCI formats (e.g., 1_1, 1_2, 1_0). In some cases, if PDCCH-Config-Multicast is used for unicast data communication in an active time of multicast DRX (e.g., if the UE 620 utilizes unicast PDCCH configured according to a multicast PDCCH configuration in PDCCH-Config-Multicast), then the unicast DCI formats can be configured within the multicast search space configuration in SearchSpaceMulticast as part of PDCCH-Config-Multicast.

In some aspects, multicast DRX can be utilized for the UE 620 comprising an XR device. Utilizing multicast DRX for an XR device UE allows for the monitoring of group common DCI formats (e.g., corresponding to examples where transmission is aligned among multiple users) in a periodicity different than that of XR video frames, for instance based on using the unicast DRX for XR video transmission and using the multicast DRX for the monitoring of group common DCI formats in the different periodicity. In some aspects, the multicast DRX can be used for XR video transmission and the unicast DRX can be used for the monitoring of group common DCI formats in the different periodicity. In some examples, if the multicast DRX is used for XR video transmission, the slot format indication (SFI) DCI (e.g., a group common DCI) can be monitored in the active time of the multicast DRX.

According to certain aspects, group common DCI formats (e.g., DCI format 2_0, 2_1, 2_2, etc.) can be monitored in the active time of the multicast DRX. Group common DCI formats may be configured within a SearchSpaceMulticast as part of PDCCH-Config-Multicast.

In some cases, in order to notify the network of its ability to perform unicast data communications in multicast DRX, the UE 620 may transmit information indicative of the UE capability. For instance, the UE 620 may transmit (e.g., and the network entity 640 may receive) information indicative of the UE 620 capability to perform unicast data communications in multicast DRX. In some aspects, the UE capability to perform unicast data communications in multicast DRX can be included in a UE capability report transmitted from the UE 620 to the network entity 640.

Figure 7:
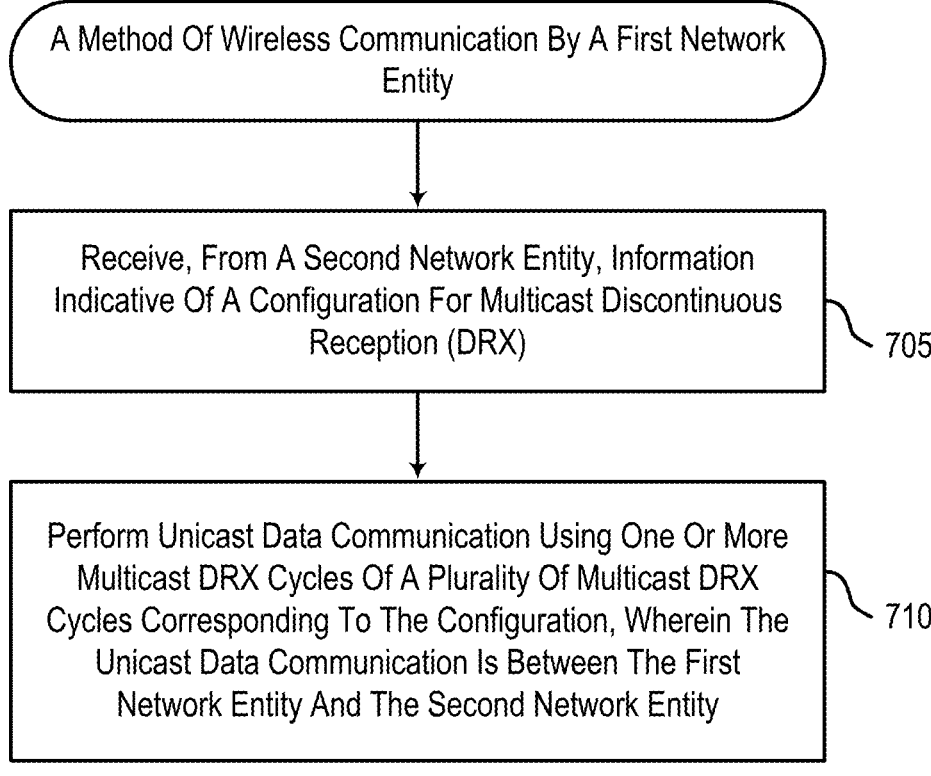
FIG. 7 depicts a method for wireless communications.

FIG. 7 shows an example of a method 700 of wireless communication by a first network entity (e.g., a UE, such as a UE 104 of FIGS. 1 and 3, etc.).

Method 700 begins at step 705 with receiving from a second network entity (e.g., base station, gNB, etc.), information indicative of a configuration for multicast DRX. In some cases, the operations of this step refer to, or may be performed by, circuitry for receiving and/or code for receiving as described with reference to FIG. 9.

Method 700 then proceeds to step 710 with performing unicast data communication using one or more multicast DRX cycles of a plurality of multicast DRX cycles corresponding to the configuration, wherein the unicast data communication is between the first network entity and the second network entity. In some cases, the operations of this step refer to, or may be performed by, circuitry for performing and/or code for performing as described with reference to FIG. 9.

In some aspects, the method 700 further includes receiving an indication that the UE is enabled to receive unicast data in active time of the DRX cycles. In some cases, the operations of this step refer to, or may be performed by, circuitry for receiving and/or code for receiving as described with reference to FIG. 9.

In some aspects, the indication is included in the configuration.

In some aspects, receiving the indication comprises receiving configuration of a group-specific RNTI that is a same value as a UE-specific RNTI.

In some aspects, performing UE-specific data communication in multicast DRX cycles according to the configuration comprises: monitoring for a PDCCH, within an active time of a multicast DRX cycle, that is scrambled with a UE-specific RNTI.

In some aspects, the method 700 further includes successfully decoding a PDCCH in a portion of the active time of the multicast DRX cycle that overlaps with an active time of a unicast DRX cycle. In some cases, the operations of this step refer to, or may be performed by, circuitry for decoding and/or code for decoding as described with reference to FIG. 9.

In some aspects, the method 700 further includes starting an inactivity timer for at least one of the multicast DRX cycle or the unicast DRX cycle. In some cases, the operations of this step refer to, or may be performed by, circuitry for starting and/or code for starting as described with reference to FIG. 9.

In some aspects, which of the multicast DRX cycle or the unicast cycle inactivity timer is started is determined based on at least one of: a predefined rule; a network configuration; which of the multicast DRX cycle or the unicast DRX cycle inactivity timer was most recently started or restarted; or whether a DCI format of the PDCCH is only configured for one of the multicast DRX cycle or the unicast DRX cycle.

In some aspects, performing UE-specific data communication in multicast DRX cycles according to the configuration comprises transmitting uplink unicast data in an active time of a multicast DRX cycle.

In some aspects, transmission of the uplink unicast data is scheduled via: a PDCCH with a CRC scrambled a group-specific RNTI; or a PDCCH with a CRC scrambled by a UE-specific RNTI.

In some aspects, transmission of HARQ feedback for unicast data transmitted in a multicast DRX cycle is: always enabled; enabled by default; or configured as part of the configuration for multicast DRX.

In some aspects, at least one of unicast PDCCH, unicast PDSCH, or unicast PDSCH by configured scheduling, during multicast DRX cycles, is configured via a multicast configuration.

In some aspects, unicast data communication in an active time of a multicast DRX cycles is scheduled via a scheduling DCI with a multicast DCI format or a unicast DCI format.

In some aspects, unicast DCI formats used for scheduling unicast data communication in an active time of multicast DRX cycles are configured within a multicast search space as part of a multicast PDCCH configuration.

In some aspects, data communication in an active time of a multicast DRX cycles is scheduled via a scheduling DCI with a group common DCI format.

In some aspects, the method 700 further includes transmitting signaling indicating information regarding a capability of the UE to perform UE-specific data communication in multicast DRX cycles. In some cases, the operations of this step refer to, or may be performed by, circuitry for transmitting and/or code for transmitting as described with reference to FIG. 9.

In one aspect, method 700, or any aspect related to it, may be performed by an apparatus, such as communications device 900 of FIG. 9, which includes various components operable, configured, or adapted to perform the method 700. Communications device 900 is described below in further detail.

Note that FIG. 7 is just one example of a method, and other methods including fewer, additional, or alternative steps are possible consistent with this disclosure.

Figure 8:
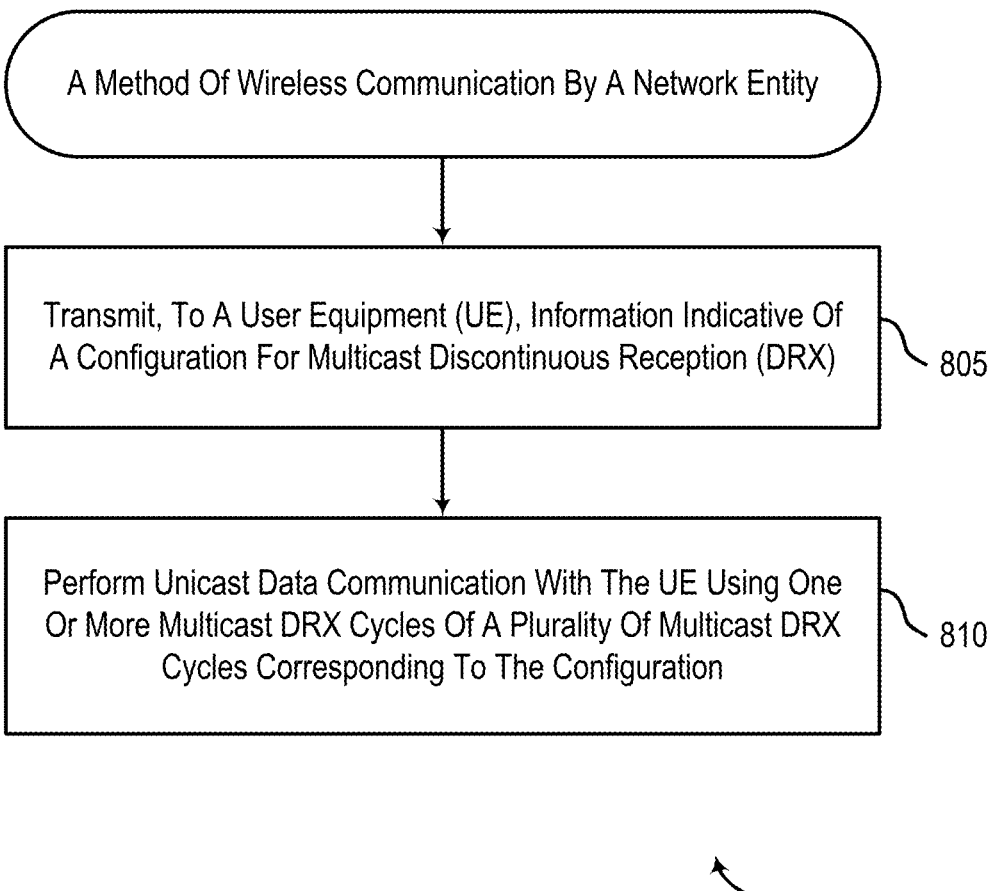
FIG. 8 depicts a method for wireless communications.

FIG. 8 shows an example of a method 800 of wireless communication by a network entity, such as a BS 102 of FIGS. 1 and 3, or a disaggregated base station as discussed with respect to FIG. 2. In some aspects, the network entity associated with performing and/or implementing the method 800 of FIG. 8 can be a network entity such as a base station, gNB, etc.

Method 800 begins at step 805 with transmitting, to a user equipment (UE), information indicative of a configuration for multicast discontinuous reception (DRX). In some cases, the UE can be the same as or similar to a UE (e.g., first network entity) associated with performing method 700 of FIG. 7. In some cases, the operations of this step refer to, or may be performed by, circuitry for transmitting and/or code for transmitting as described with reference to FIG. 9.

Method 800 then proceeds to step 810 with performing unicast data communication with the UE using one or more multicast DRX cycles of a plurality of multicast DRX cycles corresponding to the configuration. In some cases, the operations of this step refer to, or may be performed by, circuitry for performing and/or code for performing as described with reference to FIG. 9.

In some aspects, the method 800 further includes transmitting an indication that the UE is enabled to receive unicast data in active time of the DRX cycles. In some cases, the operations of this step refer to, or may be performed by, circuitry for transmitting and/or code for transmitting as described with reference to FIG. 9.

In some aspects, the indication is included in the configuration.

In some aspects, transmitting the indication comprises transmitting configuration of a group-specific RNTI that is a same value as a UE-specific RNTI.

In some aspects, performing UE-specific data communication in multicast DRX cycles according to the configuration comprises: transmitting a PDCCH, within an active time of a multicast DRX cycle, that is scrambled with a UE-specific RNTI.

In some aspects, performing UE-specific data communication in multicast DRX cycles according to the configuration comprises receiving uplink unicast data in an active time of a multicast DRX cycle.

In some aspects, the method 800 further includes scheduling transmission of the uplink unicast data via: a PDCCH with a CRC scrambled a group-specific RNTI; or a PDCCH with a CRC scrambled by a UE-specific RNTI. In some cases, the operations of this step refer to, or may be performed by, circuitry for scheduling and/or code for scheduling as described with reference to FIG. 9.

In some aspects, transmission of HARQ feedback for unicast data transmitted in a multicast DRX cycle is: always enabled; enabled by default; or configured as part of the configuration for multicast DRX.

In some aspects, at least one of unicast PDCCH, unicast PDSCH, or unicast PDSCH by configured scheduling, during multicast DRX cycles, is configured via a multicast configuration.

In some aspects, unicast data communication in an active time of a multicast DRX cycles is scheduled via a scheduling DCI with a multicast DCI format or a unicast DCI format.

In some aspects, unicast DCI formats used for scheduling unicast data communication in an active time of multicast DRX cycles are configured within a multicast search space as part of a multicast PDCCH configuration.

In some aspects, data communication in an active time of a multicast DRX cycles is scheduled via a scheduling DCI with a group common DCI format.

In some aspects, the method 800 further includes receiving signaling indicating information regarding a capability of the UE to perform UE-specific data communication in multicast DRX cycles. In some cases, the operations of this step refer to, or may be performed by, circuitry for receiving and/or code for receiving as described with reference to FIG. 9.

In one aspect, method 800, or any aspect related to it, may be performed by an apparatus, such as communications device 900 of FIG. 9, which includes various components operable, configured, or adapted to perform the method 800. Communications device 900 is described below in further detail.

Note that FIG. 8 is just one example of a method, and other methods including fewer, additional, or alternative steps are possible consistent with this disclosure.

FIG. 9 depicts aspects of an example communications device 900. In some aspects, communications device 900 is a user equipment, such as UE 104 described above with respect to FIGS. 1 and 3. In some aspects, communications device 900 is a network entity, such as BS 102 of FIGS. 1 and 3, or a disaggregated base station as discussed with respect to FIG. 2.

The communications device 900 includes a processing system 905 coupled to the transceiver 982 (e.g., a transmitter and/or a receiver). In some aspects (e.g., when communications device 900 is a network entity), processing system 905 may be coupled to a network interface 986 that is configured to obtain and send signals for the communications device 900 via communication link(s), such as a backhaul link, midhaul link, and/or fronthaul link as described herein, such as with respect to FIG. 2. The transceiver 982 is configured to transmit and receive signals for the communications device 900 via the antenna 984, such as the various signals as described herein. The processing system 905 may be configured to perform processing functions for the communications device 900, including processing signals received and/or to be transmitted by the communications device 900.

The processing system 905 includes one or more processors 910. In various aspects, the one or more processors 910 may be representative of one or more of receive processor 358, transmit processor 364, TX MIMO processor 366, and/or controller/processor 380, as described with respect to FIG. 3. In various aspects, one or more processors 910 may be representative of one or more of receive processor 338, transmit processor 320, TX MIMO processor 330, and/or controller/processor 340, as described with respect to FIG. 3. The one or more processors 910 are coupled to a computer-readable medium/memory 945 via a bus 980. In certain aspects, the computer-readable medium/memory 945 is configured to store instructions (e.g., computer-executable code) that when executed by the one or more processors 910, cause the one or more processors 910 to perform: the method 700 described with respect to FIG. 7, or any aspect related to it; and/or the method 800 described with respect to FIG. 8, or any aspect related to it. Note that reference to a processor performing a function of communications device 900 may include one or more processors 910 performing that function of communications device 900.

In the depicted example, computer-readable medium/memory 945 stores code (e.g., executable instructions), such as code for receiving 950, code for performing 955, code for decoding 960, code for starting 965, code for transmitting

970, and code for scheduling 975. Processing of the code for receiving 950, code for performing 955, code for decoding 960, code for starting 965, code for transmitting 970, and code for scheduling 975 may cause the communications device 900 to perform: the method 700 described with respect to FIG. 7, or any aspect related to it; and/or the method 800 described with respect to FIG. 8, or any aspect related to it.

The one or more processors 910 include circuitry configured to implement (e.g., execute) the code stored in the computer-readable medium/memory 945, including circuitry such as circuitry for receiving 915, circuitry for performing 920, circuitry for decoding 925, circuitry for starting 930, circuitry for transmitting 935, and circuitry for scheduling 940. Processing with circuitry for receiving 915, circuitry for performing 920, circuitry for decoding 925, circuitry for starting 930, circuitry for transmitting 935, and circuitry for scheduling 940 may cause the communications device 900 to perform: the method 700 described with respect to FIG. 7, or any aspect related to it; and/or the method 800 described with respect to FIG. 8, or any aspect related to it.

Various components of the communications device 900 may provide means for performing: the method 700 described with respect to FIG. 7, or any aspect related to it; and/or the method 800 described with respect to FIG. 8, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 982 and the antenna 984 of the communications device 900 in FIG. 9. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 982 and the antenna 984 of the communications device 900 in FIG. 9.

In some examples, the processes described herein (e.g., process 700, process 800, and/or other process described herein) may be performed by a computing device or apparatus (e.g., a network node such as a UE, base station, a portion of a base station, etc.). For instance, as noted above, the process 700 may be performed by a UE and the process 800 may be performed by a base station or a portion of a base station. In another example, the process 700 and/or the process 800 may be performed by a computing device with the computing system 900 shown in FIG. 9. For instance, a wireless communication device with the computing architecture shown in FIG. 9 may include the components of the UE and may implement the operations of FIG. 7 and/or FIG. 8.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x)

standards, data according to the Bluetooth™ standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The process 700 and the process 800 are illustrated as a logical flow diagrams, the operation of which represent a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the process 700, the process 800, and/or other process described herein, may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference is made to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. A first network entity for wireless communication, comprising: at least one memory; and at least one processor coupled to the at least one memory, wherein the first network entity is configured to: receive, from a second network entity, information indicative of a configuration for multicast discontinuous reception (DRX); and perform unicast data communication using one or more multicast DRX cycles of a plurality of multicast DRX cycles corresponding to the configuration, wherein the unicast data communication is between the first network entity and the second network entity.

Aspect 2. The first network entity of Aspect 1, wherein the first network entity is further configured to: receive, from the second network entity, an indication that the first network entity is enabled to receive unicast data during respective DRX active times of the plurality of multicast DRX cycles.

Aspect 3. The first network entity of Aspect 2, wherein the indication is included in the configuration.

Aspect 4. The first network entity of any of Aspects 2 to 3, wherein, to receive the indication, the first network entity is configured to: receive information indicative of one or more configured group-specific radio network temporary identifiers (G-RNTIs), wherein each G-RNTI of the one or more configured G-RNTIs is associated with a respective multicast DRX configuration; compare a cell-specific RNTI (C-RNTI) associated with the first network entity to the one or more configured G-RNTIs; and determine that the first network entity is enabled to receive unicast data during respective DRX active times of a plurality of multicast DRX cycles corresponding to a particular G-RNTI of the one or more configured G-RNTIs, based on the C-RNTI and the particular G-RNTI having a same value.

Aspect 5. The first network entity of any of Aspects 1 to 4, wherein, to perform unicast data communication using one or more multicast DRX cycles corresponding to the configuration, the first network entity is configured to: receive, from the second network entity, downlink (DL) unicast data during a multicast DRX cycle included in the plurality of multicast DRX cycles; or transmit, to the second network entity, uplink (UL) unicast data during a multicast DRX cycle included in the plurality of multicast DRX cycles.

Aspect 6. The first network entity of Aspect 5, wherein, to receive the DL unicast data, the first network entity is configured to: receive a physical downlink control channel (PDCCH) transmission within an active time of the multicast DRX cycle, wherein the PDCCH transmission is scrambled with a cell-specific radio network temporary identifier (C-RNTI) corresponding to the first network entity, and wherein the PDCCH transmission schedules a DL transmission of the DL unicast data; and receive the DL transmission of the DL unicast data within the multicast DRX cycle.

Aspect 7. The first network entity of any of Aspects 5 to 6, wherein the first network entity is configured to: decode a physical downlink control channel (PDCCH) transmission within a portion of the active time of the multicast DRX cycle that overlaps with a portion of an active time of a unicast DRX cycle associated with the first network entity; and start an inactivity timer for at least one of the multicast DRX cycle or the unicast DRX cycle.

Aspect 8. The first network entity of Aspect 7, wherein the first network entity is configured to: receive, from the second network entity, configuration information indicative of a selected one of the multicast DRX cycle or the unicast DRX cycle; and start the inactivity timer for the selected one of the multicast DRX cycle or the unicast DRX cycle associated with the configuration information.

Aspect 9. The first network entity of any of Aspects 7 to 8, wherein the first network entity is configured to: restart the inactivity timer for a selected one of the multicast DRX cycle or the unicast DRX cycle having a respective inactivity timer that was most recently started or restarted.

Aspect 10. The first network entity of any of Aspects 7 to 9, wherein the first network entity is configured to: determine a downlink control information (DCI) format associated with the PDCCH transmission is only configured for one of the multicast DRX cycle or the unicast DRX cycle; and start the inactivity timer for the one of the multicast DRX cycle or the unicast DRX cycle for which the DCI format associated with the PDCCH transmission is configured.

Aspect 11. The first network entity of any of Aspects 5 to 10, wherein, to transmit the UL unicast data, the first network entity is configured to transmit the UL unicast data using an UL transmission time determined based on: a cyclic redundancy check (CRC)-scrambled group-specific radio network temporary identifier (G-RNTI) included in a physical downlink control channel (PDCCH) transmission received by the first network entity; or a PDCCH with a CRC-scrambled by cell-specific RNTI (C-RNTI) included in a PDCCH transmission received by the first network entity.

Aspect 12. The first network entity of any of Aspects 1 to 11, wherein the first network entity is configured to: determine hybrid automatic repeat request (HARQ) feedback configuration information included in the information indicative of the configuration for multicast DRX; and

US 12,660,039 B2

31

32 enable or disable HARQ feedback for the unicast data communication based on the HARQ feedback configuration information.

Aspect 13. The first network entity of any of Aspects 1 to 12, wherein the first network entity is configured to perform control and data reception associated with the unicast data communication based on one or more of a unicast physical downlink control channel (PDCCH) configuration information, a unicast physical downlink shared channel (PDSCH) configuration information, or a unicast PDSCH by configured scheduling configuration information.

Aspect 14. The first network entity of any of Aspects 1 to 13, wherein the first network entity is configured to perform control and data reception associated with the unicast data communication based on one or more of a multicast physical downlink control channel (PDCCH) configuration information, a multicast physical downlink shared channel (PDSCH) configuration information, or a multicast PDSCH by configured scheduling configuration information.

Aspect 15. The first network entity of any of Aspects 1 to 14, wherein, to perform unicast data communication using one or more multicast DRX cycles, the first network entity is configured to: receive scheduling downlink control information (DCI) with a multicast DCI format or a unicast DCI format, wherein the scheduling DCI is indicative of a scheduled time for the unicast data communication; and perform the unicast data communication at the scheduled time, wherein the scheduled time is included in an active time of the one or more multicast DRX cycles.

Aspect 16. A network entity for wireless communication, comprising: at least one memory; and at least one processor coupled to the at least one memory, wherein the network entity is configured to: transmit, to a user equipment (UE), information indicative of a configuration for multicast discontinuous reception (DRX); and perform unicast data communication with the UE using one or more multicast DRX cycles of a plurality of multicast DRX cycles corresponding to the configuration.

Aspect 17. The network entity of Aspect 16, wherein the network entity is further configured to: transmit, to the UE, an indication that the UE is enabled to receive unicast data during respective multicast DRX cycles.

Aspect 18. The network entity of Aspect 17, wherein the indication is included in the configuration.

Aspect 19. The network entity of any of Aspects 17 to 18, wherein, to transmit the indication, the network entity is configured to: transmit information indicative of one or more configured group-specific radio network temporary identifiers (G-RNTIs), wherein each G-RNTI of the one or more configured G-RNTIs is associated with a respective multicast DRX configuration, and wherein at least one of one or more configured G-RNTIs has a same value as a cell-specific RNTI (C-RNTI) associated with the UE.

Aspect 20. The network entity of any of Aspects 16 to 19, wherein, to perform unicast data communication using one or more multicast DRX cycles corresponding to the configuration, the network entity is configured to: transmit, to the UE, downlink (DL) unicast data during a multicast DRX cycle included in the plurality of multicast DRX cycles; or receive, from the UE, uplink (UL) unicast data during a multicast DRX cycle included in the plurality of multicast DRX cycles.

Aspect 21. The network entity of Aspect 20 wherein, to transmit the DL unicast data, the network entity is configured to: transmit a physical downlink control channel (PDCCH) transmission within an active time of the multicast DRX cycle, wherein the PDCCH transmission is scrambled with a cell-specific radio network temporary identifier (C-RNTI) corresponding to the first network entity, and wherein the PDCCH transmission schedules a DL transmission of the DL unicast data; and transmit the DL transmission of the DL unicast data within the multicast DRX cycle.

Aspect 22. The network entity of any of Aspects 20 to 21, wherein the network entity is configured to: transmit, to the UE, a physical downlink control channel (PDCCH) transmission within a portion of the active time of the multicast DRX cycle that overlaps with a portion of an active time of a unicast DRX cycle associated with the UE.

Aspect 23. The network entity of Aspect 22, wherein the network entity is configured to: transmit, to the UE, configuration information indicative of a selected one of the multicast DRX cycle or the unicast DRX cycle, wherein the configuration information configures the UE to start an inactivity timer for the selected one of the multicast DRX cycle or the unicast DRX cycle.

Aspect 24. The network entity of any of Aspects 22 to 23, wherein the network entity is configured to: configure the UE to restart the inactivity timer for a selected one of the multicast DRX cycle or the unicast DRX cycle having a respective inactivity timer that was most recently started or restarted.

Aspect 25. The first network entity of any of Aspects 22 to 24, wherein the network entity is configured to: transmit the PDCCH transmission using a downlink control information (DCI) format that is only configured for one of the multicast DRX cycle or the unicast DRX cycle; and configure the UE to start the inactivity timer for the one of the multicast DRX cycle or the unicast DRX cycle for which the DCI format associated with the PDCCH transmission is configured.

Aspect 26. The network entity of any of Aspects 20 to 25, wherein, to receive the UL unicast data, the network entity is configured to receive the UL unicast data using an UL transmission time based on: a cyclic redundancy check (CRC)-scrambled group-specific radio network temporary identifier (G-RNTI) included in a physical downlink control channel (PDCCH) transmission transmitted by the network entity to the UE; or a PDCCH with a CRC-scrambled by cell-specific RNTI (C-RNTI) included in a PDCCH transmission transmitted by the network entity to the UE.

Aspect 27. The network entity of any of Aspects 16 to 26, wherein the network entity is configured to: determine hybrid automatic repeat request (HARQ) feedback configuration information to enable or disable HARQ feedback for the unicast data communication with the UE; and include the HARQ feedback configuration information in the information indicative of the configuration for multicast DRX.

Aspect 28. The network entity of any of Aspects 16 to 27, wherein the network entity is configured to transmit, to the UE, a configuration for control and data reception associated with the unicast data communication, wherein the configuration is based on one or more of a unicast physical downlink control channel (PDCCH) configuration information, a unicast physical downlink shared channel (PDSCH) configuration information, or a unicast PDSCH by configured scheduling configuration information.

Aspect 29. The network entity of any of Aspects 16 to 28, wherein the network entity is configured to transmit, to the UE, a configuration for control and data reception associated with the unicast data communication, wherein the configuration is based on one or more of a multicast physical downlink control channel (PDCCH) configuration information, a multicast physical downlink shared channel (PDSCH) configuration information, or a multicast PDSCH by configured scheduling configuration information.

Aspect 30. The network entity of any of Aspects 16 to 29, wherein, to perform unicast data communication using one or more multicast DRX cycles, the network entity is configured to: transmit scheduling downlink control information (DCI) with a multicast DCI format or a unicast DCI format, wherein the scheduling DCI is indicative of a scheduled time for the unicast data communication; and perform the unicast data communication at the scheduled time, wherein the scheduled time is included in an active time of the one or more multicast DRX cycles.

Aspect 31. A method comprising performing operations according to any of Aspects 1 to 15.

Aspect 32. A method comprising performing operations according to any of Aspects 16 to 30.

Aspect 33. An apparatus for wireless communication comprising one or more means for performing operations according to any of Aspects 1 to 15.

Aspect 34. An apparatus for wireless communication comprising one or more means for performing operations according to any of Aspects 16 to 30.

Aspect 35. A non-transitory computer-readable storage medium comprising instructions stored thereon which, when executed by at least one processor, causes the at least one processor to perform operations according to any of Aspects 1 to 15.

Aspect 36. A non-transitory computer-readable storage medium comprising instructions stored thereon which, when executed by at least one processor, causes the at least one processor to perform operations according to any of Aspects 16 to 30.

Aspect 37. A method of wireless communication by a UE, comprising: receiving from a network entity, signaling of a configuration for multicast DRX; and performing UE-specific data communication in multicast DRX cycles according to the configuration.

Aspect 38. The method of Aspect 37, further comprising: receiving an indication that the UE is enabled to receive unicast data in active time of the DRX cycles.

Aspect 39. The method of Aspect 38, wherein the indication is included in the configuration.

Aspect 40. The method of any of Aspects 38 to 39, wherein receiving the indication comprises receiving configuration of a group-specific RNTI that is a same value as a UE-specific RNTI.

Aspect 41. The method of any of Aspects 38 to 40, wherein performing UE-specific data communication in multicast DRX cycles according to the configuration comprises: monitoring for a PDCCH, within an active time of a multicast DRX cycle, that is scrambled with a UE-specific RNTI.

Aspect 42. The method of Aspect 41, further comprising: successfully decoding a PDCCH in a portion of the active time of the multicast DRX cycle that overlaps with an active time of a unicast DRX cycle; and starting an inactivity timer for at least one of the multicast DRX cycle or the unicast DRX cycle.

Aspect 43. The method of Aspect 42, wherein which of the multicast DRX cycle or the unicast cycle inactivity timer is started is determined based on at least one of: a predefined rule; a network configuration; which of the multicast DRX cycle or the unicast DRX cycle inactivity timer was most recently started or restarted; or whether a DCI format of the PDCCH is only configured for one of the multicast DRX cycle or the unicast DRX cycle.

Aspect 44. The method of any one of Aspects 37 to 43, wherein performing UE-specific data communication in multicast DRX cycles according to the configuration comprises transmitting uplink unicast data in an active time of a multicast DRX cycle.

Aspect 45. The method of Aspect 44, wherein transmission of the uplink unicast data is scheduled via: a PDCCH with a CRC scrambled a group-specific RNTI; or a PDCCH with a CRC scrambled by a UE-specific RNTI.

Aspect 46. The method of any one of Aspects 37 to 45, wherein transmission of HARQ feedback for unicast data transmitted in a multicast DRX cycle is: always enabled; enabled by default; or configured as part of the configuration for multicast DRX.

Aspect 47. The method of any one of Aspects 37 to 46, wherein at least one of unicast PDCCH, unicast PDSCH, or unicast PDSCH by configured scheduling, during multicast DRX cycles, is configured via a multicast configuration.

Aspect 48. The method of any one of Aspects 37 to 47, wherein unicast data communication in an active time of a multicast DRX cycles is scheduled via a scheduling DCI with a multicast DCI format or a unicast DCI format.

Aspect 49. The method of any one of Aspects 37 to 48, wherein unicast DCI formats used for scheduling unicast data communication in an active time of multicast DRX cycles are configured within a multicast search space as part of a multicast PDCCH configuration.

Aspect 50. The method of any one of Aspects 37 to 49, wherein data communication in an active time of a multicast DRX cycles is scheduled via a scheduling DCI with a group common DCI format.

Aspect 51. The method of any one of Aspects 37 to 50, further comprising: transmitting signaling indicating information regarding a capability of the UE to perform UE-specific data communication in multicast DRX cycles.

Aspect 52. A method of wireless communication by a network entity, comprising: transmitting signaling of a configuration for multicast DRX at a UE; and performing UE-specific data communication in multicast DRX cycles according to the configuration.

Aspect 53. The method of Aspect 52, further comprising: transmitting an indication that the UE is enabled to receive unicast data in active time of the DRX cycles.

Aspect 54. The method of Aspect 53, wherein the indication is included in the configuration.

Aspect 55. The method of any of Aspects 53 to 54, wherein transmitting the indication comprises transmitting configuration of a group-specific RNTI that is a same value as a UE-specific RNTI.

Aspect 56. The method of any of Aspects 53 to 55, wherein performing UE-specific data communication in multicast DRX cycles according to the configuration comprises: transmitting a PDCCH, within an active time of a multicast DRX cycle, that is scrambled with a UE-specific RNTI.

Aspect 57. The method of any one of Aspects 52 to 56, wherein performing UE-specific data communication in multicast DRX cycles according to the configuration comprises receiving uplink unicast data in an active time of a multicast DRX cycle.

Aspect 58. The method of Aspect 57, further comprising: scheduling transmission of the uplink unicast data via: a PDCCH with a CRC scrambled a group-specific RNTI; or a PDCCH with a CRC scrambled by a UE-specific RNTI.

Aspect 59. The method of any one of Aspects 52 to 58, wherein transmission of HARQ feedback for unicast data transmitted in a multicast DRX cycle is: always enabled; enabled by default; or configured as part of the configuration for multicast DRX.

Aspect 60. The method of any one of Aspects 52 to 59, wherein at least one of unicast PDCCH, unicast PDSCH, or unicast PDSCH by configured scheduling, during multicast DRX cycles, is configured via a multicast configuration.

Aspect 61. The method of any one of Aspects 52 to 60, wherein unicast data communication in an active time of a multicast DRX cycles is scheduled via a scheduling DCI with a multicast DCI format or a unicast DCI format.

Aspect 62. The method of any one of Aspects 52 to 61, wherein unicast DCI formats used for scheduling unicast data communication in an active time of multicast DRX cycles are configured within a multicast search space as part of a multicast PDCCH configuration.

Aspect 63. The method of any one of Aspects 52 to 62, wherein data communication in an active time of a multicast DRX cycles is scheduled via a scheduling DCI with a group common DCI format.

Aspect 64. The method of any one of Aspects 52 to 63, further comprising: receiving signaling indicating information regarding a capability of the UE to perform UE-specific data communication in multicast DRX cycles.

Aspect 65. An apparatus, comprising: a memory comprising executable instructions; and a processor configured to execute the executable instructions and cause the apparatus to perform a method in accordance with any one of Aspects 37-64.

Aspect 66. An apparatus, comprising means for performing a method in accordance with any one of Aspects 37 to 64.

Aspect 67. A non-transitory computer-readable medium comprising executable instructions that, when executed by a processor of an apparatus, cause the apparatus to perform a method in accordance with any one of Aspects 37 to 67.

Aspect 68. A computer program product embodied on a computer-readable storage medium comprising code for performing a method in accordance with any one of Aspects 37 to 67.

What is claimed is:

1. A first network entity for wireless communication, comprising:
   at least one memory; and
   at least one processor coupled to the at least one memory, wherein the first network entity is configured to:
   receive, from a second network entity, information indicative of a configuration for multicast discontinuous reception (DRX) and information indicative of one or more configured group-specific radio network temporary identifiers (G-RNTIs), wherein each G-RNTI of the one or more configured G-RNTIs is associated with a respective multicast DRX configuration;
   determine, based on a cell-specific RNTI (C-RNTI) associated with the first network entity having a same value as a particular G-RNTI of the one or more configured G-RNTIs, that the first network entity is enabled to receive unicast data during respective DRX active times of a plurality of multicast DRX cycles corresponding to the particular G-RNTI; and
   perform unicast data communication using one or more multicast DRX cycles of a plurality of multicast DRX cycles corresponding to the configuration, wherein the unicast data communication is between the first network entity and the second network entity.

2. The first network entity of claim 1, wherein the first network entity is configured to:
   compare the C-RNTI associated with the first network entity to the one or more configured G-RNTIs.

3. The first network entity of claim 1, wherein, to perform unicast data communication using one or more multicast DRX cycles corresponding to the configuration, the first network entity is configured to:
   receive, from the second network entity, downlink (DL) unicast data during a multicast DRX cycle included in the plurality of multicast DRX cycles; or
   transmit, to the second network entity, uplink (UL) unicast data during a multicast DRX cycle included in the plurality of multicast DRX cycles.

4. The first network entity of claim 1, wherein the first network entity is configured to:
   determine hybrid automatic repeat request (HARQ) feedback configuration information included in the information indicative of the configuration for multicast DRX; and
   enable or disable HARQ feedback for the unicast data communication based on the HARQ feedback configuration information.

5. The first network entity of claim 1, wherein the first network entity is configured to perform control and data reception associated with the unicast data communication based on one or more of a unicast physical downlink control channel (PDCCH) configuration information, a unicast physical downlink shared channel (PDSCH) configuration information, or a unicast PDSCH by configured scheduling configuration information.

6. The first network entity of claim 1, wherein the first network entity is configured to perform control and data reception associated with the unicast data communication based on one or more of a multicast physical downlink control channel (PDCCH) configuration information, a multicast physical downlink shared channel (PDSCH) configuration information, or a multicast PDSCH by configured scheduling configuration information.

7. The first network entity of claim 1, wherein, to perform unicast data communication using one or more multicast DRX cycles, the first network entity is configured to:
   receive scheduling downlink control information (DCI) with a multicast DCI format or a unicast DCI format, wherein the scheduling DCI is indicative of a scheduled time for the unicast data communication; and
   perform the unicast data communication at the scheduled time, wherein the scheduled time is included in a multicast DRX cycle of the one or more multicast DRX cycles.

8. A first network entity for wireless communication, comprising:
   at least one memory; and
   at least one processor coupled to the at least one memory, wherein the first network entity is configured to:
   receive, from a second network entity, information indicative of a configuration for multicast discontinuous reception (DRX); and
   perform unicast data communication using one or more multicast DRX cycles of a plurality of multicast DRX cycles corresponding to the configuration, wherein the unicast data communication is between the first network entity and the second network entity, wherein, to perform unicast data communication using one or more multicast DRX cycles corresponding to the configuration, the first network entity is configured to receive, from the second network entity, downlink (DL) unicast data during a multicast DRX cycle included in the plurality of multicast DRX cycles, and wherein, to receive the DL unicast data, the first network entity is configured to:

receive a physical downlink control channel (PDCCH) transmission within an active time of the multicast DRX cycle, wherein the PDCCH transmission is scrambled with a cell-specific radio network temporary identifier (C-RNTI) corresponding to the first network entity, and wherein the PDCCH transmission schedules a DL transmission of the DL unicast data; and receive the DL transmission of the DL unicast data within the multicast DRX cycle.

9. A first network entity for wireless communication, comprising:

at least one memory; and at least one processor coupled to the at least one memory, wherein the first network entity is configured to:

receive, from a second network entity, information indicative of a configuration for multicast discontinuous reception (DRX);

perform unicast data communication using one or more multicast DRX cycles of a plurality of multicast DRX cycles corresponding to the configuration, wherein the unicast data communication is between the first network entity and the second network entity, and wherein, to perform unicast data communication using one or more multicast DRX cycles corresponding to the configuration, the first network entity is configured to: receive, from the second network entity, downlink (DL) unicast data during a multicast DRX cycle included in the plurality of multicast DRX cycles, or transmit, to the second network entity, uplink (UL) unicast data during a multicast DRX cycle included in the plurality of multicast DRX cycles;

decode a physical downlink control channel (PDCCH) transmission within a portion of an active time of the multicast DRX cycle that overlaps with a portion of an active time of a unicast DRX cycle associated with the first network entity; and start an inactivity timer for at least one of the multicast DRX cycle or the unicast DRX cycle.

10. The first network entity of claim 9, wherein the first network entity is configured to:

receive, from the second network entity, configuration information indicative of a selected one of the multicast DRX cycle or the unicast DRX cycle; and start the inactivity timer for the selected one of the multicast DRX cycle or the unicast DRX cycle associated with the configuration information.

11. The first network entity of claim 9, wherein the first network entity is configured to:

restart the inactivity timer for a selected one of the multicast DRX cycle or the unicast DRX cycle having a respective inactivity timer that was most recently started or restarted.

12. The first network entity of claim 9, wherein the first network entity is configured to:

determine a downlink control information (DCI) format associated with the PDCCH transmission is only configured for one of the multicast DRX cycle or the unicast DRX cycle; and start the inactivity timer for the one of the multicast DRX cycle or the unicast DRX cycle for which the DCI format associated with the PDCCH transmission is configured.

13. A first network entity for wireless communication, comprising:

at least one memory; and at least one processor coupled to the at least one memory, wherein the first network entity is configured to:

receive, from a second network entity, information indicative of a configuration for multicast discontinuous reception (DRX); and perform unicast data communication using one or more multicast DRX cycles of a plurality of multicast DRX cycles corresponding to the configuration, wherein the unicast data communication is between the first network entity and the second network entity, wherein, to perform unicast data communication using one or more multicast DRX cycles corresponding to the configuration, the first network entity is configured to transmit, to the second network entity, uplink (UL) unicast data during a multicast DRX cycle included in the plurality of multicast DRX cycles, and wherein, to transmit the UL unicast data, the first network entity is configured to transmit the UL unicast data using an UL transmission time determined based on:

a cyclic redundancy check (CRC)-scrambled group-specific radio network temporary identifier (G-RNTI) included in a physical downlink control channel (PDCCH) transmission received by the first network entity; or a PDCCH with a CRC-scrambled by cell-specific RNTI (C-RNTI) included in a PDCCH transmission received by the first network entity.

14. The first network entity of claim 13, wherein, to transmit the UL unicast data, the first network entity is configured to transmit the UL unicast data using an UL transmission time determined based on the CRC-scrambled G-RNTI included in the PDCCH transmission received by the first network entity.

15. The first network entity of claim 13, wherein, to transmit the UL unicast data, the first network entity is configured to transmit the UL unicast data using an UL transmission time determined based on the PDCCH with the CRC-scrambled by the C-RNTI included in the PDCCH transmission received by the first network entity.

16. A network entity for wireless communication, comprising:

at least one memory; and at least one processor coupled to the at least one memory, wherein the network entity is configured to:

transmit, to a user equipment (UE), information indicative of a configuration for multicast discontinuous reception (DRX) and information indicative of one or more configured group-specific radio network temporary identifiers (G-RNTIs), wherein each G-RNTI of the one or more configured G-RNTIs is associated with a respective multicast DRX configuration, and wherein at least one of the one or more configured G-RNTIs has a same value as a cell-specific RNTI (C-RNTI) associated with the UE; and perform unicast data communication with the UE using one or more multicast DRX cycles of a plurality of multicast DRX cycles corresponding to the configuration.

17. The network entity of claim 16, wherein, to perform unicast data communication using one or more multicast DRX cycles corresponding to the configuration, the network entity is configured to:

transmit, to the UE, downlink (DL) unicast data during a multicast DRX cycle included in the plurality of multicast DRX cycles; or receive, from the UE, uplink (UL) unicast data during a multicast DRX cycle included in the plurality of multicast DRX cycles.

18. The network entity of claim 16, wherein the network entity is configured to:

determine hybrid automatic repeat request (HARQ) feedback configuration information to enable or disable HARQ feedback for the unicast data communication with the UE; and include the HARQ feedback configuration information in the information indicative of the configuration for multicast DRX.

19. The network entity of claim 16, wherein the network entity is configured to transmit, to the UE, a configuration for control and data reception associated with the unicast data communication, wherein the configuration is based on one or more of a unicast physical downlink control channel (PDCCH) configuration information, a unicast physical downlink shared channel (PDSCH) configuration information, or a unicast PDSCH by configured scheduling configuration information.

20. The network entity of claim 16, wherein the network entity is configured to transmit, to the UE, a configuration for control and data reception associated with the unicast data communication, wherein the configuration is based on one or more of a multicast physical downlink control channel (PDCCH) configuration information, a multicast physical downlink shared channel (PDSCH) configuration information, or a multicast PDSCH by configured scheduling configuration information.

21. The network entity of claim 16, wherein, to perform unicast data communication using one or more multicast DRX cycles, the network entity is configured to:

transmit scheduling downlink control information (DCI) with a multicast DCI format or a unicast DCI format, wherein the scheduling DCI is indicative of a scheduled time for the unicast data communication; and perform the unicast data communication at the scheduled time, wherein the scheduled time is included in a multicast DRX cycle of the one or more multicast DRX cycles.

22. A network entity for wireless communication, comprising:

at least one memory; and at least one processor coupled to the at least one memory, wherein the network entity is configured to:

transmit, to a user equipment (UE), information indicative of a configuration for multicast discontinuous reception (DRX); and perform unicast data communication with the UE using one or more multicast DRX cycles of a plurality of multicast DRX cycles corresponding to the configuration, wherein, to perform unicast data communication using one or more multicast DRX cycles corresponding to the configuration, the network entity is configured to transmit, to the UE, downlink (DL) unicast data during a multicast DRX cycle included in the plurality of multicast DRX cycles, and wherein, to transmit the DL unicast data, the network entity is configured to:

transmit a physical downlink control channel (PDCCH) transmission within an active time of the multicast DRX cycle, wherein the PDCCH transmission is scrambled with a cell-specific radio network temporary identifier (C-RNTI) corresponding to the first network entity, and wherein the PDCCH transmission schedules a DL transmission of the DL unicast data; and transmit the DL transmission of the DL unicast data within the multicast DRX cycle.

23. A network entity for wireless communication, comprising:

at least one memory; and at least one processor coupled to the at least one memory, wherein the network entity is configured to:

transmit, to a user equipment (UE), information indicative of a configuration for multicast discontinuous reception (DRX);

perform unicast data communication with the UE using one or more multicast DRX cycles of a plurality of multicast DRX cycles corresponding to the configuration, wherein, to perform unicast data communication using one or more multicast DRX cycles corresponding to the configuration, the network entity is configured to transmit, to the UE, downlink (DL) unicast data during a multicast DRX cycle included in the plurality of multicast DRX cycles, or receive, from the UE, uplink (UL) unicast data during a multicast DRX cycle included in the plurality of multicast DRX cycles; and transmit, to the UE, a physical downlink control channel (PDCCH) transmission within a portion of an active time of the multicast DRX cycle that overlaps with a portion of an active time of a unicast DRX cycle associated with the UE.

24. The network entity of claim 23, wherein the network entity is configured to:

transmit, to the UE, configuration information indicative of a selected one of the multicast DRX cycle or the unicast DRX cycle, wherein the configuration information configures the UE to start an inactivity timer for the selected one of the multicast DRX cycle or the unicast DRX cycle.

25. The network entity of claim 23, wherein the network entity is configured to:

configure the UE to restart the inactivity timer for a selected one of the multicast DRX cycle or the unicast DRX cycle having a respective inactivity timer that was most recently started or restarted.

26. The first network entity of claim 23, wherein the network entity is configured to:

transmit the PDCCH transmission using a downlink control information (DCI) format that is only configured for one of the multicast DRX cycle or the unicast DRX cycle; and configure the UE to start the inactivity timer for the one of the multicast DRX cycle or the unicast DRX cycle for which the DCI format associated with the PDCCH transmission is configured.

27. A network entity for wireless communication, comprising:

at least one memory; and at least one processor coupled to the at least one memory, wherein the network entity is configured to:

transmit, to a user equipment (UE), information indicative of a configuration for multicast discontinuous reception (DRX); and perform unicast data communication with the UE using one or more multicast DRX cycles of a plurality of multicast DRX cycles corresponding to the configuration, wherein, to perform unicast data communication using one or more multicast DRX cycles corresponding to the configuration, the network entity is configured to receive, from the UE, uplink (UL) unicast data during a multicast DRX cycle included in the plurality of multicast DRX cycles, and wherein, to receive the UL unicast data, the network entity is configured to receive the UL unicast data using an UL transmission time based on:

a cyclic redundancy check (CRC)-scrambled group-specific radio network temporary identifier (G-RNTI) included in a physical downlink control channel (PDCCH) transmission transmitted by the network entity to the UE; or a PDCCH with a CRC-scrambled by cell-specific RNTI (C-RNTI) included in a PDCCH transmission transmitted by the network entity to the UE.

28. The network entity of claim 27, wherein, to receive the UL unicast data, the network entity is configured to receive the UL unicast data using an UL transmission time based on the CRC-scrambled G-RNTI included in the PDCCH transmission transmitted by the network entity to the UE.

29. The network entity of claim 27, wherein, to receive the UL unicast data, the network entity is configured to receive the UL unicast data using an UL transmission time based on the PDCCH with the CRC-scrambled by the C-RNTI included in the PDCCH transmission transmitted by the network entity to the UE.

* * * * *